L. S. PARKER.
PIPE COUPLING.
APPLICATION FILED FEB. 20, 1915.

1,193,483. Patented Aug. 1, 1916.

Witnesses:

Inventor
Lewis S. Parker
By his Attorneys

UNITED STATES PATENT OFFICE.

LEVIN S. PARKER, OF NEW YORK, N. Y., ASSIGNOR TO PARKER UNIVERSAL COUPLING COMPANY, INCORPORATED, OF NEW YORK, N. Y., A CORPORATION OF NEW YORK.

PIPE-COUPLING.

1,193,483.

Specification of Letters Patent.

Patented Aug. 1, 1916.

Application filed February 20, 1915. Serial No. 9,757.

*To all whom it may concern:*

Be it known that I, LEVIN S. PARKER, a citizen of the United States, residing in New York city, borough of Brooklyn, in the county of Kings and State of New York, have invented certain new and useful Improvements in Pipe-Couplings, of which the following is a specification.

My invention relates to pipe couplings, and particularly to a coupling for pipes of large diameter such as pontoon pipes employed in connection with hydraulic dredging apparatus.

The object of my invention is to facilitate, and make more reliable, the coupling together of pipes of large diameter.

The diameters of discharge pipes of hydraulic dredges vary from 12 to 36 inches in diameter and the lengths of the individual sections comprised in the pipe are usually about 30 to 40 feet in length and supported by pontoons. The distance from the dredge to the spoil bank is a varying one, and requires a pipe line connected together in such a way that the number of pipes in the line can be quickly and easily increased or decreased at will, thus lengthening or shortening the line. At the same time the line must have flexibility, which is usually provided for in the couplings between the pipe sections. The efficiency in a pipe line depends largely upon manipulation of the same—that is to say, the efficiency of the pipe line depends on the manner in which the various units are connected and disconnected, and the time it takes to make up a line, and how secure these connections are when made.

I will describe a pipe coupling embodying my invention, and then point out the novel features thereof in claims.

Figure 1:
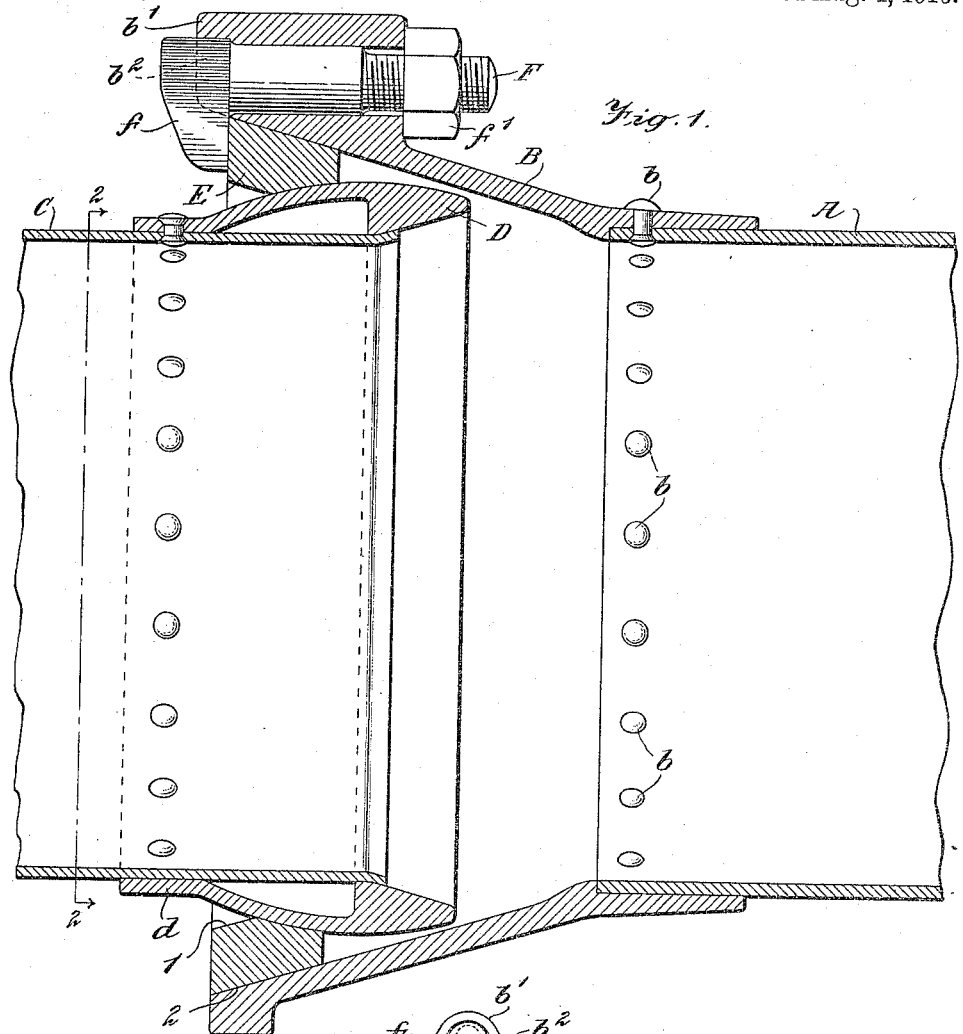
Figure 2:
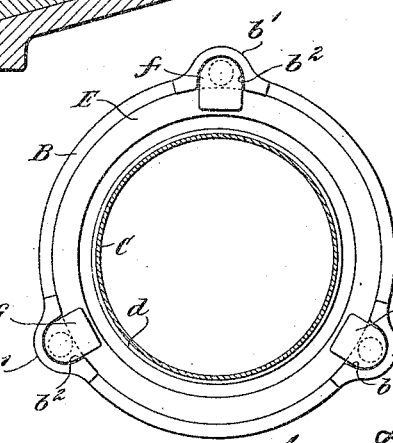

In the accompanying drawings, Figure 1 is a vertical sectional view of a coupling embodying my invention; Fig. 2 is an end view partly in section on the line 2—2 of Fig. 1, and looking in the direction of the arrows at the end of the section line.

Similar reference characters designate corresponding parts in both of the figures.

A designates a portion of a pipe section of a dredging line which may be of sheet metal or without seam. It is provided at one end with an annular flaring portion B, here shown as being in a separate piece and joined to the pipe section A by means of rivets $b$. The flaring portion B, however, may be integral with the pipe section A. In the drawings I have shown the member B as being made of plate and riveted together, but it may be a single casting.

C designates a second portion of a pipe section of a dredging line, similar in material and construction to the portion A. It is provided on one end with an annular member D having a curved or arc-shaped outer surface and with a sleeve portion $d$ by means of which it is riveted or otherwise secured to the pipe C.

It will be understood that each pipe section A or C will have at one end a member B and at its other end a member D.

E designates a ring of a diameter which will not permit of its being slipped off of a pipe section A or C. The function of this ring is to hold a member D in position within a member B. Its face adjacent the member D, for a portion thereof, conforms with the surface of the member D, and the remaining portion is tapered as indicated at 1. This taper will permit of the flexing of the coupling, the limit of such flexing occurring when the sleeve $d$ engages the surface 1. The opposite face 2 of the ring E is tapered or inclined to conform with the inner surface of the member B. Thus the ring is substantially wedge-shaped in cross-section so that it can easily enter the opening between the adjacent surfaces of the members B and D. The ring E is also preferably of a width that the face which is engaged by the hooks $f$ (hereinafter described) will coincide or register with the edge of the member B when the ring E has been moved the requisite distance inward between the members B and D.

The member B carries a plurality of lugs $b$ which may be integral therewith or be formed on a ring which is secured by rivets to the member B. Each lug is provided with an opening to receive a bolt F, one end of which is provided with a hook $f$ which engages a face of the ring E. The bolt is also provided with a nut $f'$ working against a face of the lug $b$ in order to draw the hook $f$ against the ring E. Each lug is also provided with means $b^2$ which engage with the hook $f$ to prevent its being turned when it is in engagement with the ring. As here shown the means $b^2$ are in the form of an arc-shaped flange which embrace the hooks $f$.

The operation of coupling two pipe sections is as follows: The bolts F are loosened so that the hooks will be free of the flanges $b^2$ and turned so that the member D can enter the member C. The ring E is then moved into position between the two members, and the hook $f$ turned to position to engage the ring E and within their flanges $b^2$. The nuts are then turned to draw the bolts inward and the hooks $f$ against the ring E. To uncouple the pipe sections it is only necessary to loosen the nuts to free the hooks $f$ from the flanges $b^2$ and give them a partial turn.

What I claim and desire to secure by Letters Patent of the United States is:—

1. A flexible pipe coupling comprising a flared member, a second member entering the flared member, a ring between the two members for holding them together and having a face thereof coinciding with the edge of the flared member when the ring is in proper position between the two members and having two surfaces which conform to the adjacent surfaces of the two said members, and means for holding the ring in position between the two members, said means comprising a flange for preventing movement of the holding means and thus displacement of the ring from between the two members.

2. A flexible pipe coupling comprising a flared member, a second member entering the flared member, a ring between the two members for holding them in position and having two surfaces which conform to the adjacent surfaces of the two said members, bolts and nuts for holding the ring in position, and means carried by one of said members for preventing the bolts being disengaged from the ring.

3. A flexible pipe coupling comprising a flared member, a second member entering the flared member, a ring between the two members for holding them in position and having two surfaces which conform to the adjacent surfaces of the two said members, lugs carried by one of the members, bolts carried by the lugs and having hooks for engaging the ring, and a flange carried by each lug for holding the hooks from disengagement from the ring.

4. A flexible pipe coupling comprising a flared member, a second member having an arc-shaped surface entering therein, a ring between the two said members for holding them in position and having two surfaces which conform to the adjacent surfaces of the two said members, and having a tapering portion to permit and limit the flexing of the joint, and means for holding the ring in position between the two members.

In testimony whereof I have hereunto singed my name in the presence of two subscribing witnesses.

LEVIN S. PARKER.

Witnesses:
M. E. McNINCH,
GEO. E. CRUSE.

Copies of this patent may be obtained for five cents each, by addressing the "Commissioner of Patents, Washington, D. C."